Patented Oct. 12, 1943

2,331,711

UNITED STATES PATENT OFFICE 2,331,711

METHOD OF PREPARING ALPHA-NAPHTHYLACETAMIDE

Vartkes Migrdichian, Greenwich, Conn., assignor to American Cyanamid Company, New York, N. Y., a corporation of Maine No Drawing. Application March 28, 1942, Serial No. 436,615

5 Claims. (Cl. 260—558)

This invention relates to a method of preparing alpha-naphthylacetamide.

This compound is highly effective as an apple drop preventive agent when applied to the tree just prior to fruit maturity. It is also of value as an intermediate in the synthesis of alpha-naphthylacetic acid, the latter being particularly useful as a plant growth promoter or for initiating root formation.

A principal object of the present invention is the provision of a novel, economical and convenient method for preparing alpha-naphthylacetamide. A further object is the provision of a method for the production of alpha-naphthylacetamide which is characterized by high yields and purity of product. Other objects will become apparent as the description of the invention proceeds.

These objects may be accomplished by dissolving alpha-naphthylacetonitrile in warm sulfuric acid, heating the solution for a sufficient period, pouring the resulting solution into water and separating the thus precipitated alpha-naphthylacetamide.

In carrying out the process, it is essential that the sulfuric acid contain only such quantity of water as will permit solubility of the alpha-naphthylacetonitrile therein.

The solution of alpha-naphthylacetonitrile in sulfuric acid is heated, preferably at a temperature between 70 and 150° C., cooled and poured into a quantity of water sufficient to precipitate the alpha-naphthylacetamide. The product is filtered from the aqueous acid solution, washed with water and dried. It can be freed of small quantities of alpha-naphthylacetic acid which may form in the process by washing with 5% aqueous sodium hydroxide solution. Further purification may be obtained by recrystallization from warm alcohol.

The invention will be illustrated in greater detail by the following examples. Parts indicated are by weight.

Example 1

165 parts of alpha-naphthylacetonitrile are added slowly to a mixture of 258 parts of concentrated sulfuric acid (96%) and 90 parts of water heated to 140° C. The resulting solution is held at 120° C. for 15 minutes, then cooled and poured into 2000 parts of water at room temperature. The precipitated crude alpha-naphthylacetamide is filtered off, treated with 200 parts of warm 5% sodium hydroxide solution, again filtered, washed with water and dried. After 2 recrystallizations from alcohol, alpha-naphthylacetamide of 97.5% purity is obtained as a white crystalline product melting at 182–184° C.

Example 2

110 parts of alpha-naphthylacetonitrile are added slowly to 172 parts of concentrated sulfuric acid (96%) warmed to 70° C. The temperature of the solution rises slowly and is finally held at 125° C. for 20 minutes. The solution is then poured into 1350 parts of water at room temperature. The precipitated alpha-naphthylacetamide is removed by filtration, washed with water and dried at 40° C.

A simple and convenient method is available for the production of alpha-naphthylacetamide of high purity.

While the invention has been described with particular reference to specific embodiments, it is to be understood that it is not to be limited thereto but is to be construed broadly and restricted solely by the scope of the appended claims.

I claim:

1. The method which includes the steps of heating a solution consisting of alpha-naphthylacetonitrile dissolved in sulfuric acid, adding the solution to a quantity of water whereby alpha-naphthylacetamide is precipitated, separating and recovering the alpha-naphthylacetamide.

2. The method of claim 1 wherein the sulfuric acid contains only such quantity of water as will permit solubility of the alpha-naphthylacetonitrile therein.

3. The method of claim 1 wherein the solution of alpha-naphthylacetonitrile in sulfuric acid is heated at a temperature within the range of 70 to 150° C.

4. The method of preparing alpha-naphthylacetamide which comprises dissolving alpha-naphthylacetonitrile in warm sulfuric acid, heating the solution to a temperature within the range of 70 to 150° C., adding the resulting solution to a quantity of water sufficient to precipitate the alpha-naphthylacetamide, separating and recovering the alpha-naphthylacetamide.

5. The method of preparing alpha-naphthylacetamide which comprises dissolving alpha-naphthylacetonitrile in warm 96% sulfuric acid, heating the solution to a temperature within the range of 70 to 150° C., adding the resulting solution to a quantity of water at room temperature sufficient to precipitate the alpha-naphthylacetamide, separating and recovering the alpha-naphthylacetamide.

VARTKES MIGRDICHIAN.